(12) United States Patent
Kawada

(10) Patent No.: US 11,196,910 B2
(45) Date of Patent: *Dec. 7, 2021

(54) ACCESSORY DEVICE, IMAGING APPARATUS, AND COMMUNICATION CONTROL PROGRAM

(71) Applicant: CANON KABUSHIKI KAISHA, Tokyo (JP)

(72) Inventor: Kazutoshi Kawada, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/847,332

(22) Filed: Apr. 13, 2020

(65) Prior Publication Data

US 2020/0244866 A1 Jul. 30, 2020

Related U.S. Application Data

(63) Continuation of application No. 16/146,348, filed on Sep. 28, 2018, now Pat. No. 10,659,671, which is a (Continued)

(30) Foreign Application Priority Data

Mar. 31, 2016 (JP) .............................. JP2016-072985

(51) Int. Cl.
*H04N 5/232* (2006.01)
*H04N 5/225* (2006.01)
(Continued)

(52) U.S. Cl.
CPC .......... *H04N 5/23203* (2013.01); *G03B 5/00* (2013.01); *G03B 15/05* (2013.01); *G03B 17/14* (2013.01);
(Continued)

(58) Field of Classification Search
CPC .... H04N 5/23203; H04N 5/2254; H04N 5/04; H04N 5/232; H04N 5/225; G03B 17/565;
(Continued)

(56) References Cited

U.S. PATENT DOCUMENTS 5,463,442 A  10/1995 Harigay et al.
10,659,671 B2 * 5/2020 Kawada ............. H04N 5/23203
(Continued)

FOREIGN PATENT DOCUMENTS

CN  102630308 A  8/2012
EP  0669757 B1  11/2002
GN  104040423 A  9/2014

*Primary Examiner* — Abdelaaziz Tissire
(74) *Attorney, Agent, or Firm* — Canon U.S.A., Inc IP Division

(57) ABSTRACT

An imaging apparatus that provides, between itself and an accessory device, a notification channel used for notification from the imaging apparatus to the accessory device, a first data communication channel used in data transmission from the accessory device to the imaging apparatus, and a second data communication channel used in data transmission from the imaging apparatus to the accessory device. An accessory control unit executes switching of communication methods while notifying the imaging apparatus of a communication standby request for keeping data communication from the imaging apparatus to the accessory device from being performed, via the notification channel.

10 Claims, 7 Drawing Sheets

Related U.S. Application Data continuation of application No. PCT/JP2017/012384, filed on Mar. 27, 2017.

(51) Int. Cl.
| | |
|---|---|
| *G03B 15/05* | (2021.01) |
| *G03B 17/56* | (2021.01) |
| *G03B 17/14* | (2021.01) |
| *G03B 5/00* | (2021.01) |
| *H04N 5/04* | (2006.01) |

(52) U.S. Cl.
CPC ............ *G03B 17/565* (2013.01); *H04N 5/04* (2013.01); *H04N 5/2254* (2013.01); *H04N 5/2257* (2013.01); *H04N 5/232* (2013.01); *H04N 5/23209* (2013.01); *G03B 2206/00* (2013.01)

(58) Field of Classification Search
CPC .... G03B 17/14; G03B 2206/00; G03B 15/05; G03B 5/00
See application file for complete search history.

(56) References Cited

U.S. PATENT DOCUMENTS

| | | | | |
|---|---|---|---|---|
| 2009/0285572 | A1* | 11/2009 | Shibuno | G03B 3/10 396/133 |
| 2011/0170853 | A1* | 7/2011 | Osawa | G03B 17/14 396/529 |
| 2012/0155853 | A1* | 6/2012 | Osawa | G03B 17/14 396/529 |
| 2013/0286235 | A1* | 10/2013 | Matsumoto | H04N 5/23209 348/220.1 |
| 2013/0308042 | A1* | 11/2013 | Kawada | H04N 5/23209 348/360 |
| 2017/0223241 | A1* | 8/2017 | Yamatsuta | G03B 17/14 |
| 2018/0115697 | A1* | 4/2018 | Kawada | H04N 5/23258 |
| 2018/0224720 | A1* | 8/2018 | Pan | G03B 17/14 |

* cited by examiner

COMMUNICATION CMD1

COMMUNICATION CMD2

ACCESSORY DEVICE, IMAGING APPARATUS, AND COMMUNICATION CONTROL PROGRAM

CROSS-REFERENCE TO RELATED APPLICATIONS

This application is a Continuation of U.S. patent application Ser. No. 16/146,348, which was filed on Sep. 28, 2018 and which is a Continuation of International Patent Application No. PCT/JP2017/012384, which was filed on Mar. 27, 2017 and which claims priority to Japanese Patent Application No. 2016-072985, which was filed on Mar. 31, 2016, all of which are hereby incorporated by reference herein in their entirety.

TECHNICAL FIELD

The present invention relates to an imaging apparatus, and an accessory device such as an interchangeable lens or the like, which are communicable with each other.

BACKGROUND ART

There are known lens-replacement type camera systems where an imaging apparatus, which is the camera main body, performs imaging processing and lens control, and lens devices which are interchangeable lenses perform lens driving in accordance with control commands from the camera main body. In such camera systems, transmission of control commands from the camera main body to the interchangeable lens, and transmission of lens information from the interchangeable lens to the camera main body, are performed via a communication channel for exchanging information with each other.

Of such lens-replacement type camera systems, digital camera systems in particular require smooth lens control in accordance with imaging cycles when shooting moving images or taking live view images. Accordingly, the imaging timing of the camera main body and the control timing of the interchangeable lens need to be synchronized, and the camera main body needs to complete obtaining of lens information necessary for lens control and transmission of control commands to the interchangeable lens within an imaging cycle.

PTL 1 discloses a clock-synchronized communication system made up of three channels, which are a clock channel, a data transmission channel from the camera main body to the interchangeable lens, and a data transmission channel from the interchangeable lens to the camera main body. In this communication system, the camera main body serves as a communication master to generate clock signals, and outputs one frame of clock signals to the interchangeable lens via the clock channel. The interchangeable lens and the camera main body then exchange information synchronized with the clock signals.

However, in the communication system according to PTL 1, the interchangeable lens serving as a communication slave cannot communicate data to the camera main body unless it receives a transmission request signal from the camera main body serving as the communication master.

PTL 2 discloses an imaging system where the communication method is changed to an asynchronous communication method, and where information indicating that data communication will be performed can be transmitted from the interchangeable lens to the camera main body via the channel used as the clock channel in clock-synchronized communication.

CITATION LIST

Patent Literature

PTL 1: Japanese Patent Laid-Open No. 9-304804
PTL 2: Japanese Patent Laid-Open No. 2010-266595

In the imaging system according to PTL 2, data communication is voluntarily executed from the interchangeable lens to the camera main body via the channel used as a clock channel in clock-synchronized communication, taking advantage of the fact that clock synchronization signals are unnecessary in an asynchronous communication method.

Such switching of communication methods between an asynchronous communication method and a clock-synchronized communication method for a particular purpose is known, but PTL 2 does not disclose any particular switching procedures of communication methods.

In order to switch between the above-described two communication methods in an image system made up of three channels, appropriately setting switching procedures for communication methods at the interchangeable lens and imaging apparatus is important.

It is an object of the present invention to realize an accessory device and imaging apparatus capable of executing switching of communication methods without leading to breakdown of communication, without adding new channels.

SUMMARY OF INVENTION

An accessory device according to the present invention is an accessory device detachably mounted to an imaging apparatus, having an accessory communication unit that provides, between itself and the imaging apparatus, channels made up of a notification channel used for notification between the imaging apparatus and the accessory device, a first data communication channel (accessory data communication channel) used in data transmission from the accessory device to the imaging apparatus, and a second data communication channel (imaging apparatus data communication channel) used in data transmission from the imaging apparatus to the accessory device, and an accessory control unit that performs control of the accessory communication unit. The imaging apparatus and the accessory device are each capable of switching a communication state thereof between first settings corresponding to a clock-synchronized communication method that is synchronized with clock signals, and second settings corresponding to an asynchronous communication method. In the first settings, in accordance with having received a notification for switching from the first settings to the second settings from the imaging apparatus, the accessory control unit notifies the imaging apparatus of a communication standby request for keeping data communication from the imaging apparatus to the accessory device from being performed, via the notification channel. The accessory control unit performs switching from the first settings to the second settings while notifying of the communication standby request.

An imaging apparatus according to the present invention is an imaging apparatus to which an accessory device is detachably mounted, having a camera communication unit that provides, between itself and the accessory device, channels made up of a notification channel used for notification from the imaging apparatus to the accessory device, a first data communication channel used in data transmission from the accessory device to the imaging apparatus, and a second data communication channel used in data transmission from the imaging apparatus to the accessory device, and a camera control unit that performs control of the camera communication unit. The imaging apparatus and the accessory device are each capable of switching a communication state thereof between first settings corresponding to a clock-synchronized communication method that is synchronized with clock signals, and second settings corresponding to an asynchronous communication method. The camera control unit performs switching from the first settings to the second settings by receiving a notification indicating that switching for the first settings to the second settings at the accessory device has been completed, via the notification channel.

Further features of the present invention will become apparent from the following description of exemplary embodiments with reference to the attached drawings.

DESCRIPTION OF EMBODIMENTS

A communication control method in an interchangeable lens serving as an accessory device and a camera main body serving as an imaging apparatus according to the present invention will be described in detail with reference to the attached drawings. First, definition of terms in the present embodiment will be described.

"Communication format" indicates rules regarding the entire communication between the camera main body and the interchangeable lens. "Communication method" means the clock-synchronized method and asynchronous method, with the clock-synchronized method being communication method A and the asynchronous method being communication method B. "Data format" indicates whether or not a communication standby request signal (BUSY signal) is added, with a data format where adding a BUSY signal is permitted is "format F1", while a data format where adding a BUSY signal is forbidden is "format F2".

"Communication mode" means a combination of communication method and data format, and the following three communication modes will be described in the present embodiment. "Communication mode M1" is a communication mode of communication method A and format F1, and "communication mode M2" is a communication mode of communication method B and format F1. "Communication mode M3" is a communication mode of communication method B and format F2.

The present invention is an invention regarding switching procedures for changing the communication method from the clock-synchronized method (communication method A) to the asynchronous method (communication method B). An imaging system having a camera main body and interchangeable lens that are capable of communication with the communication method switched from communication method A to communication method B will be illustrated in the following embodiment. A configuration where the communication method can be appropriately switched enables an imaging system to be realized in which an appropriate communication method can be selected in accordance with the combination of camera main body and interchangeable lens. For example, in a case where the camera main body and interchangeable lens both are compatible with communication method B, switching the communication state of each to settings corresponding to the communication method B realizes data communication by the communication method B.

When executing clock-synchronized communication in an imaging system made up of three channels, there may be cases where the communication master needs to be switched by time management between the camera main body that outputs clock signals and the interchangeable lens that outputs communication standby requests over the same channel. Accordingly, there is a need to provide time for switching the communication master in order to prevent collision of communication, i.e., a communication-invalid time during which communication cannot be performed, which as a result may lead to delay in communication and control.

Figure 1:
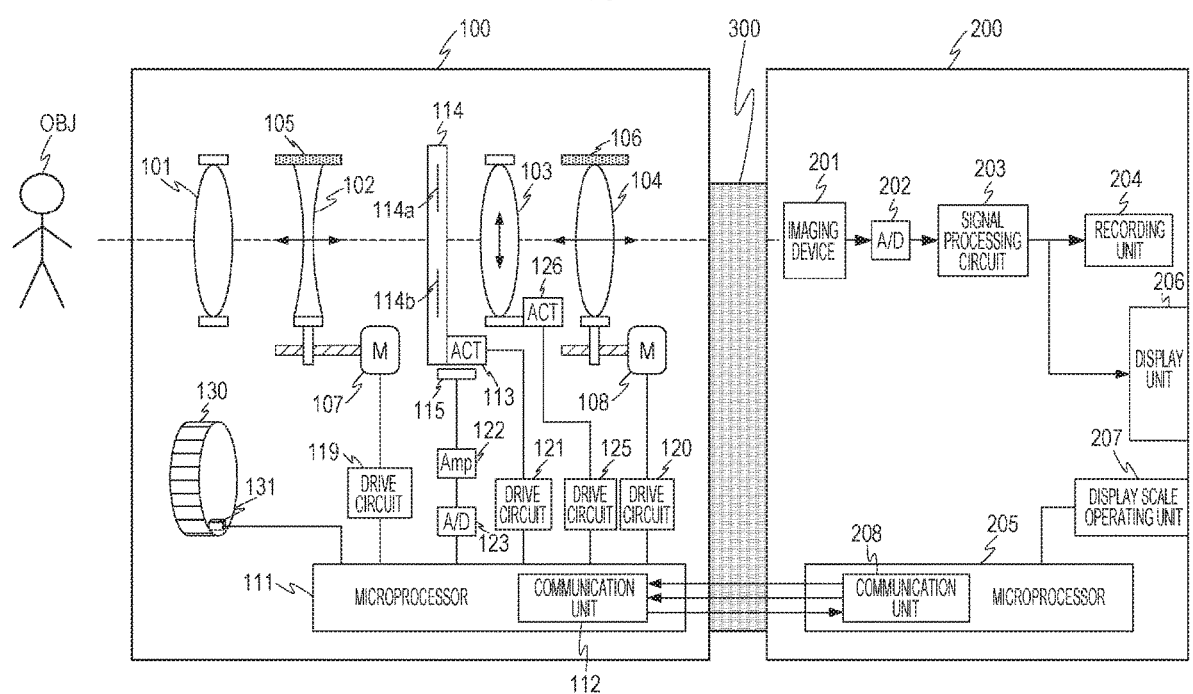
FIG. 1 is a block diagram illustrating the configuration of a camera system including an imaging apparatus and an accessory device according to the present invention.

FIG. 1 illustrates the configuration of an imaging system (hereinafter referred to as camera system) including a camera main body 200 serving as an imaging apparatus that is the first embodiment of the present invention, and an interchangeable lens 100 serving as an accessory device detachably mounted thereto.

The camera main body 200 and interchangeable lens 100 perform transmission of control commands and internal information via communication units that each has. Each communication unit supports multiple communication formats, and is capable of selecting an optimal communication format under various situations by synchronously switching to the same communication format as each other in accordance with the type of communication data and purpose of communication.

First, a specific configuration of the interchangeable lens 100 and camera main body 200 will be described. The interchangeable lens 100 and camera main body 200 are mechanically and electrically connected via a mount 300 that is a coupling mechanism. The interchangeable lens 100 receives supply of power from the camera main body 200 via power source terminal, omitted from illustration, provided to the mount 300, and controls later-described actuators of various types, and a lens microprocessor 111. The interchangeable lens 100 and camera main body 200 communicate with each other via communication terminals (illustrated in FIG. 2) provided to the mount 300.

The interchangeable lens 100 has an imaging optical system. The imaging optical system includes, in order from an object OBJ side, a field lens 101, a zoom lens 102 that changes zoom power, a diaphragm unit 114 that adjusts the quantity of light, an image stabilization lens 103, and a focus lens 104 that performs focal point adjustment.

The zoom lens 102 and focus lens 104 are respectively held by lens holding frames 105 and 106. The lens holding frames 105 and 106 are movably guided in the optical axis direction, illustrated in the diagram as a dotted line, by a guide shaft omitted from illustration, and are driven in the optical axis direction by respective stepping motors 107 and 108. The stepping motors 107 and 108 move the zoom lens 102 and focus lens 104 synchronously with driving pulses.

The image stabilization lens 103 reduces image blurring due to shaking of hands and so forth, by moving in a direction orthogonal to the optical axis of the imaging optical system.

The lens microprocessor 111 is an accessory control unit for controlling operations of the parts within the interchangeable lens 100. The lens microprocessor 111 receives control commands transmitted from the camera main body 200, and receives transmission requests for lens data, via a lens communication unit 112 serving as an accessory communication unit. The lens microprocessor 111 performs lens control corresponding to the control commands, and transmits lens data corresponding to transmission requests to the camera main body 200 via the lens communication unit 112.

The lens microprocessor 111 also outputs driving signals to a zoom drive circuit 119 and focus drive circuit 120, in response to commands relating to zooming and focusing, out of the control commands, thereby driving the stepping motors 107 and 108. Accordingly, zoom processing where zooming operations by the zoom lens 102 are controlled, and autofocus processing where focal point adjustment operations by the focus lens 104 are controlled, are carried out.

The diaphragm unit 114 is configured including diaphragm blades 114a and 114b. The state of the diaphragm blades 114a and 114b is detected by a Hall effect device 115, and input to the lens microprocessor 111 via an amplifying circuit 122 and an A/D conversion circuit 123. The lens microprocessor 111 outputs drive signals to a diaphragm drive diaphragm circuit 121 based on input signals from the A/D conversion circuit 123, and drives a diaphragm actuator 113. Accordingly, light quantity adjustment operations by the diaphragm unit 114 are controlled.

Further, the lens microprocessor 111 drives an anti-vibration actuator 126 via an anti-vibration drive circuit 125 in accordance with shaking detected by an unshown shaking sensor such as a vibration gyro or the like provided within the interchangeable lens 100. Accordingly, anti-vibration processing that controls shifting operations of the image stabilization lens 103 is performed.

The camera main body 200 has an imaging device 201 such as a CCD sensor or CMOS sensor or the like, an A/D conversion circuit 202, a signal processing circuit 203, a recording unit 204, a camera microprocessor 205, and a display unit 206.

The imaging device 201 performs photoelectric conversion of a subject image formed by the imaging optical system within the interchangeable lens 100, and outputs electric signals (analog signals). The A/D conversion circuit 202 coverts analog signals from the imaging device 201 into digital signals. The signal processing circuit 203 subjects digital signals from the A/D conversion circuit 202 to various types of image processing, and generates video signals.

The signal processing circuit 203 also generates luminance information indicating the contrast state of the subject image from the video signals, i.e., focus information indicating the focal state of the imaging optical system and the exposure state. The signal processing circuit 203 outputs the video signals to the display unit 206, and the display unit 206 displays the video signals as a live preview image used for confirming the composition, focus state, and so forth, of the video signals.

The camera microprocessor 205 serving as a camera control unit performs control of the camera main body 200 in accordance with input from camera operating members, such as an imaging instructing switch, various types of setting switches, and so forth, that are omitted from illustration. The camera microprocessor 205 also transmits control commands relating to zooming operations of the zoom lens 102 in accordance with operation of an unshown zoom switch to the lens microprocessor 111, via a camera data transmission/reception unit 208b. The camera microprocessor 205 further transmits control commands relating to light quantity adjustment operations of the diaphragm unit 114 in accordance with luminance information, and focal point adjustment operations of the focus lens 104 in accordance with focus information, to the lens microprocessor 111 via the camera data transmission/reception unit 208b.

Figure 2:
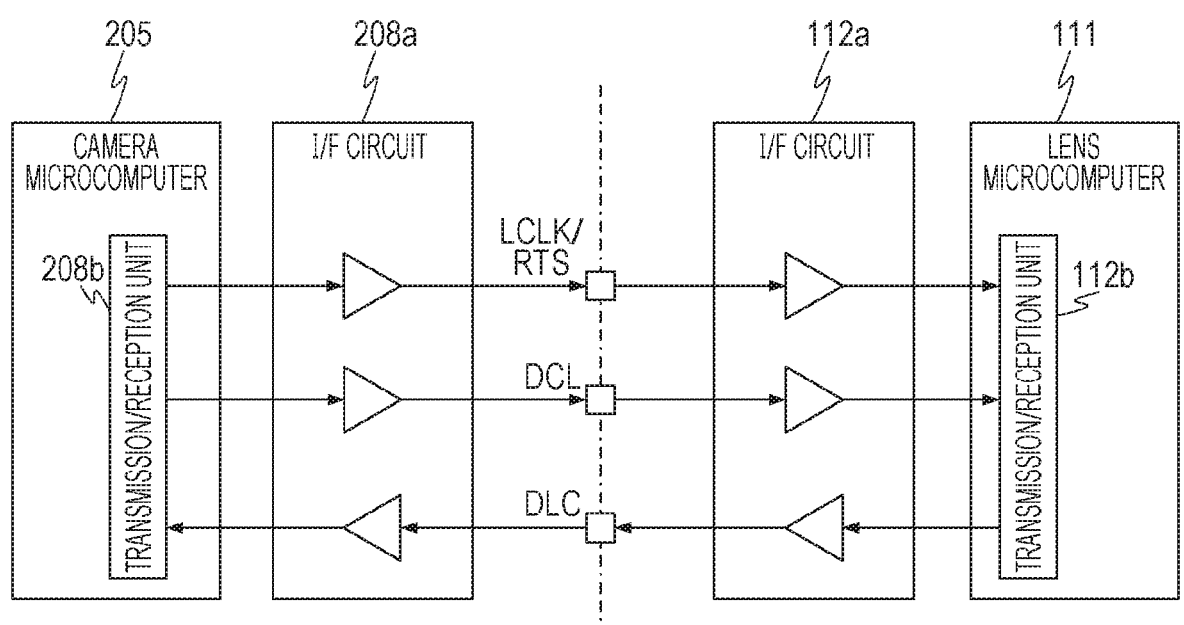
FIG. 2 is a schematic diagram illustrating communication circuits between the imaging apparatus and accessory device.

Next, communication circuits configured between the camera main body 200 and interchangeable lens 100, and communication control performed therebetween, will be described with reference to FIG. 2. The camera microprocessor 205 has a function of managing communication formats between itself and the lens microprocessor 111, and a function of notifying the lens microprocessor 111 of transmission requests and so forth. The lens microprocessor 111 also has a function of generating lens data and a function of transmitting the lens data.

The camera microprocessor 205 and lens microprocessor 111 perform communication through communication terminals provided to the mount 300, and communication interface circuits 208a and 112a provided to each respectively. Here, the communication interface circuit 208a and camera data transmission/reception unit 208b will be collectively referred to as a camera communication unit 208, and the communication interface circuit 112a and a lens data transmission/reception unit 112b will be collectively referred to as the lens communication unit 112.

In the present embodiment, the camera microprocessor 205 and the lens microprocessor 111 perform serial communication by three-line communication method A and communication method B using three channels.

One of the above-described three channels is the clock channel in the communication method A, and is a notification channel serving as a transmission request channel in the communication method B. One of the remaining two channels is a first data communication channel that is used for lens data transmission from the lens microprocessor 111 to the camera microprocessor 205. The other one channel is a second data communication channel used for transmission of camera data from the camera microprocessor 205 to the lens microprocessor 111. Lens data transmitted from the lens microprocessor 111 to the camera microprocessor 205 as signals over the first data communication channel will be referred to as lens data signals DLC. Camera data transmitted from the camera microprocessor 205 to the lens microprocessor 111 as signals over the second data communication channel will be referred to as camera data signals DCL.

First, communication by the communication method A will be described. In the communication method A, clock signals LCLK are output from the camera microprocessor 205 serving as the communication master to the lens microprocessor 111 serving as a communication slave, via the clock channel. The camera data signals DCL include control commands, transmission request commands, and so forth, from the camera microprocessor 205 to the lens microprocessor 111.

On the other hand, the lens data signals DLC include various types of data transmitted from the lens microprocessor 111 to the camera microprocessor 205 synchronously with the clock signals LCLK. The camera microprocessor 205 and the lens microprocessor 111 are capable of communicating by the full-duplex communication system where transmission and reception is performed mutually and simultaneously in synchronization with common clock signals LCLK.

Figure 3A:
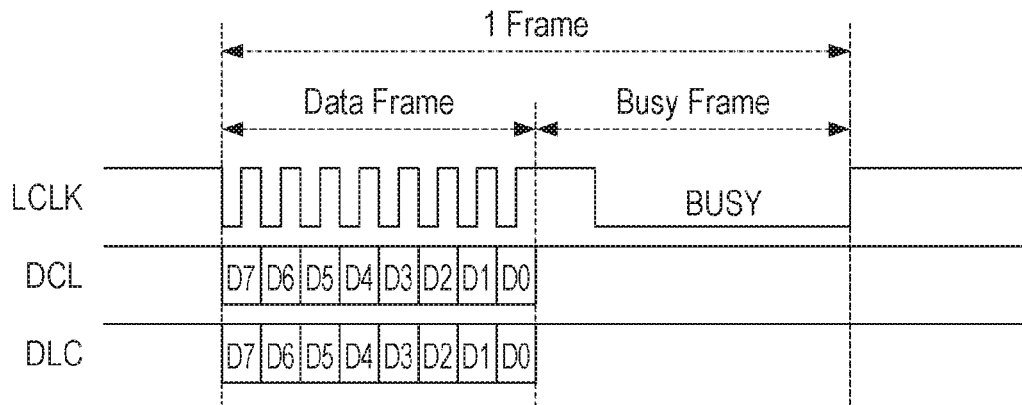
FIGS. 3A through 3C are schematic diagrams illustrating communication waveforms in a communication mode M1.
Figure 3B:
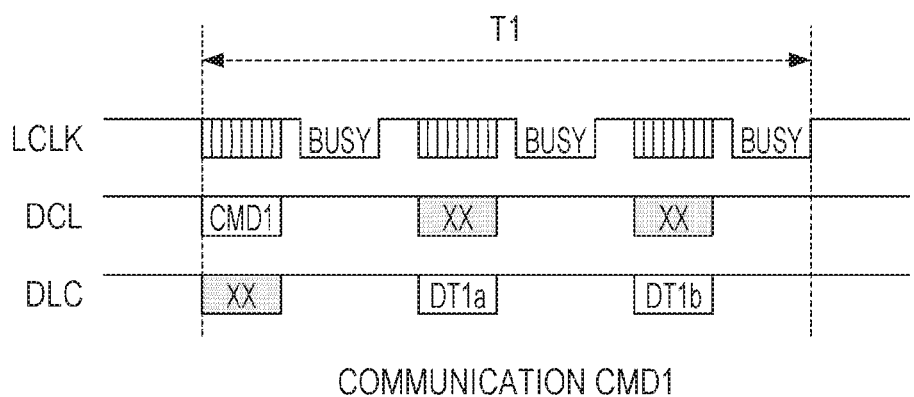
Figure 3C:
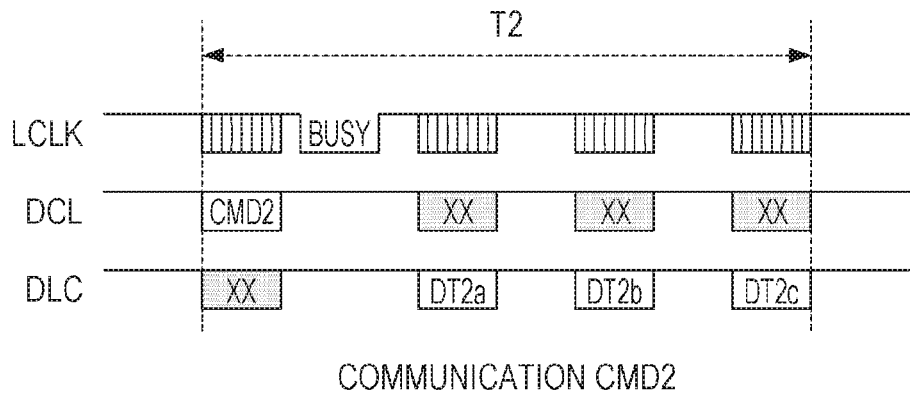

FIGS. 3A through 3C illustrate waveforms of signals exchanged between the camera microprocessor 205 and lens microprocessor 111. Rules decided for procedures for this exchange are referred to as a communication protocol.

FIG. 3A illustrates signal waveforms of one frame, that is the smallest increment of communication. First, the camera microprocessor 205 outputs clock signals LCLK of which clock pulses of eight cycles is one set, and transmits camera data signals DCL to the lens microprocessor 111 synchronously with the clock signals LCLK. At the same time, the camera microprocessor 205 receives the lens data signals DLC output from the lens microprocessor 111 synchronously with the clock signals LCLK.

Thus, one byte (eight bits) of data is transmitted and received between the lens microprocessor 111 and camera microprocessor 205 synchronously with the ones set of clock signals LCLK. The period for transmission/reception of one byte of data is called a data frame. After transmission/reception of this one byte of data, the lens microprocessor 111 transmits a signal notifying a communication standby request BUSY to the camera microprocessor 205 (hereinafter referred to as a BUSY signal), whereby a communication standby period is inserted. This communication standby period is referred to as a BUSY frame, and the camera microprocessor 205 is in a communication standby state while receiving the BUSY frame. A communication increment of one set of data frame period and BUSY fame period makes of one frame. Depending on the communication state, there are cases where no BUSY frame is added, in which cases one frame is made up of just the data frame period.

FIG. 3B illustrates the signal waveforms when the camera microprocessor 205 transmits a request command CMD1 to the lens microprocessor 111, and receives corresponding two-byte lens data DT1 (DT1a, DT1b) from the lens microprocessor 111. FIG. 3B illustrates an example of data communication being executed in accordance with "communication CMD1".

Types of lens data DT and byte counts corresponding to each of multiple types of commands CMD are stipulated beforehand regarding the camera microprocessor 205 and lens microprocessor 111. When the camera microprocessor 205 that is the communication master transmits a particular command CMD to the lens microprocessor 111, the lens microprocessor 111 transmits a clock count that is necessary based on the lens data byte count corresponding to this command CMD to the camera microprocessor 205. The processing of the lens microprocessor 111 in accordance with the command CMD1 includes superimposing a BUSY signal on the clock signals LCLK in each frame, with the above-described BUSY frame being inserted between the data frames.

In communication CMD1, the camera microprocessor 205 transmits clock signals LCLK to the lens microprocessor 111, and further transmits a request command CMD1 requesting transmission of lens data DT1 to the lens microprocessor 111 as camera data signals DCL. The lens data signals DLC in this frame is handled as invalid data.

Next, after having output eight cycles of clock signals LCLK over the clock channel, the camera microprocessor 205 switches the clock channel at the camera microprocessor side (camera main body side) from output settings to input settings. Upon the switching of the clock channel at the camera microprocessor side being completed, the lens microprocessor 111 switches the clock channel at the lens microprocessor 111 side (interchangeable lens side) from input settings to output settings. The lens microprocessor 111 then sets the voltage level of the clock channel to Low, to notify the camera microprocessor 205 of a communication standby request BUSY. Accordingly, a BUSY signal is superimposed on the clock channel. During the period in which the communication standby request BUSY is being notified, the camera microprocessor 205 maintains input settings of the clock channel, and stops communication to the lens microprocessor 111.

The lens microprocessor 111 generates lens data DT1 corresponding to the transmission request command CMD1 during notification of the communication standby request BUSY. Upon preparation for transmitting the lens data DT1 as the lens data signals DLC of the next frame, the signal level of the clock channel at the lens microprocessor side is switched to High, and the communication standby request BUSY is cancelled.

Upon recognizing the cancellation of the communication standby request BUSY, the camera microprocessor 205 transmits one frame of clock signals LCLK to the lens microprocessor 111, thereby receiving lens data DT1a from the lens microprocessor 111. The camera microprocessor 205 that has output eight cycles of clock signals LCLK again in the next frame, and the lens microprocessor 111 repeats the same operations as described above, whereby the camera microprocessor 205 receives lens data DT1b from the lens microprocessor 111.

FIG. 3C illustrates signal waveforms when the camera microprocessor 205 transmits a request command CMD2 to the lens microprocessor 111 and receives three bytes of lens data DT2 (DT2a through DT2c) corresponding thereto from the lens microprocessor 111. FIG. 3C illustrates an example of data communication being executed in accordance with communication CMD2. The processing of the lens microprocessor 111 in accordance with the request command CMD2 in this communication CMD2 includes superimposing a BUSY signal on the clock channel only in the first frame. That is to say, the lens microprocessor 111 does not superimpose a BUSY signal on the subsequent second frame through fourth frame.

Accordingly, no BUSY frame is inserted between frames from the second frame through the fourth frame, and the standby period between frames can be reduced. However, the lens microprocessor 111 cannot transmit a communication standby request to the camera microprocessor 205 during periods where BUSY frames are not inserted. Accordingly, the data count for transmission, transmission intervals, the order of priority of communication processing within the lens microprocessor 111, and so forth, need to be decided beforehand, so that there is no breakdown of communication as a result.

Figure 4:
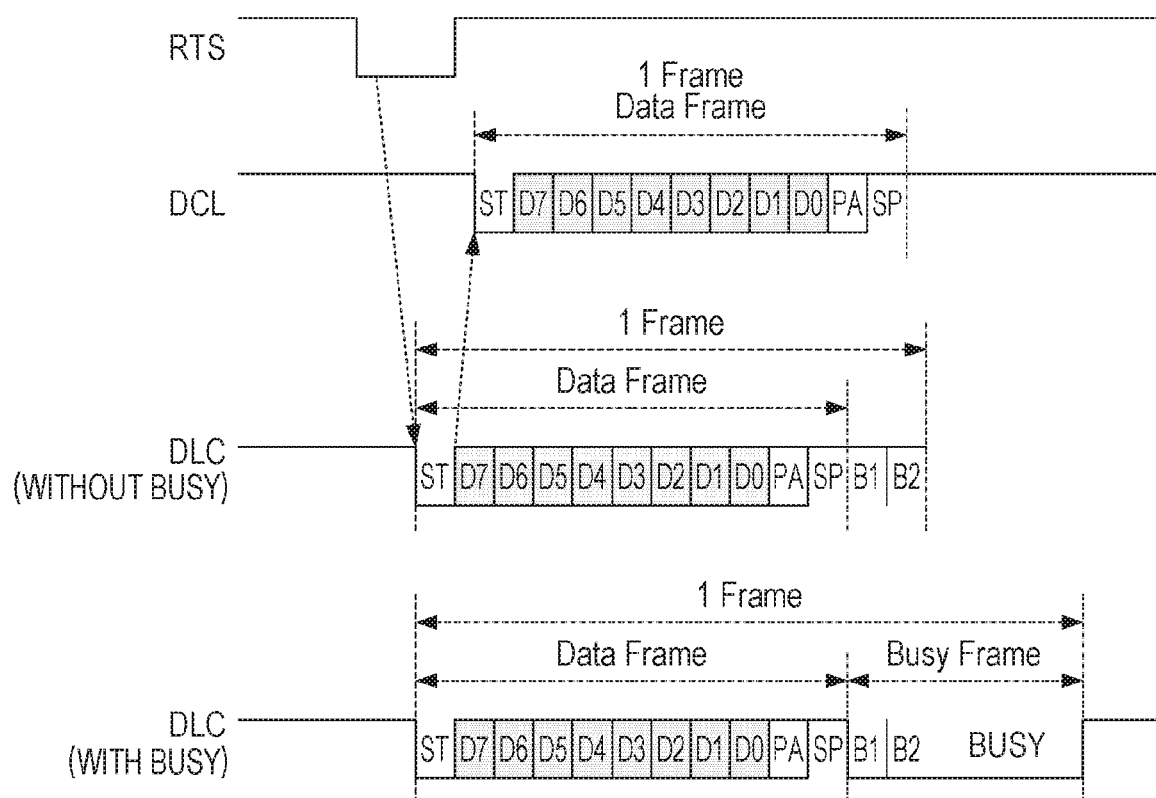
FIG. 4 is a schematic diagram illustrating communication waveforms in a communication mode M2.

Next, the communication method B will be described. The communication mode M2 where communication is performed by format F1 using the communication method B will be described as well. FIG. 4 illustrates waveforms of communication signals exchanged between the camera microprocessor 205 and the lens microprocessor 111 in the communication mode M2. Adding a BUSY frame to the lens data signals DLC is permitted in the format F1, as described earlier.

The transmission request channel is used for notification of lens data transmission requests and so forth, from the camera microprocessor 205 serving as the communication master to the lens microprocessor 111 serving as a communication slave, in the communication method B. Notification over the transmission request channel is performed by switching the level (voltage level) of signals on this transmission request channel between High (first level) and Low (second level). In the following description, signals supplied to the transmission request channel in the communication method B will be referred to as transmission request signals RTS.

The first data communication channel is used for transmission of lens data signals DLC including various types of data from the lens microprocessor 111 to the camera microprocessor 205, in the same way as with the communication method A. The second data communication channel is also used for transmission of camera data signals DCL including control commands and transmission request commands and so forth from the camera microprocessor 205 to the lens microprocessor 111, in the same way as in communication method A.

Unlike the communication method A, the camera microprocessor 205 and lens microprocessor 111 have the communication speed set beforehand and transmit/receive at a communication bitrate based on this setting in the communication method B, instated of performing data transmission/reception synchronously with common clock signals. The communication bitrate indicates the amount of data that can be transmitted per second, and the unit is expressed as bps (bits per second).

Note that in the present embodiment, the camera microprocessor 205 and lens microprocessor 111 communicate by the full-duplex communication system where mutual transmission/reception is performed in this communication method B, in the same way as with the communication method A.

FIG. 4 illustrates signal waveforms of one frame, that is the smallest increment of communication. The breakdown of the data format of one frame partially differs between the camera data signals DCL and lens data signals DLC.

First, the data format of the lens data signals DLC will be described. One frame of lens data signals DLC is made up of the data frame at the first half and the subsequent BUSY frame. The signal level of the lens data signals DLC is maintained at High in a state where data transmission is not being performed.

The lens microprocessor 111 sets the voltage level of the lens data signals DLC to LOW for a period of one bit, in order to notify the camera microprocessor 205 of the start of transmission of one frame of the lens data signals DLC. This one-bit period is called a start bit ST, and the data frame is started from the start bit ST. The lens microprocessor 111 subsequently transmits one byte of lens data in an eight-byte period from the second bit following the start bit ST through the ninth bit.

The array of data bits is an MSB (Most Significant Bit)-first format, starting from the highest order data D7, continuing in order to data D6, data D5, and ends on the lowest order data D0. The lens microprocessor 111 then adds one bit of parity information (PA) at the tenth bit, and sets the voltage level of the lens data signals DLC to HIGH for the period of a stop bit SP indicating the last of one frame. Thus, the data frame period started from the start bit ST is ended. Note that the parity information does not have to be one bit, and that parity information of multiple bits may be added. The parity information is not indispensable either, and a format may be used where parity information is not added.

Next, the lens microprocessor 111 adds a BUSY frame after the stop bit SP, as indicated by "DLC (WITH BUSY)" in the drawing. The BUSY frame indicates the period of communication standby request BUSY where the lens microprocessor 111 notifies the camera microprocessor 205, in the same way as in the communication method A. The lens microprocessor 111 maintains the signal level of the lens data signals DLC to Low, until the communication standby request BUSY is cancelled.

On the other hand, there are cases where notification of communication standby request BUSY from the lens microprocessor 111 to the camera microprocessor 205 is unnecessary. Accordingly, a data format where one frame is configured without adding a BUSY frame (hereinafter also referred to as BUSY notification) is also provided for such cases, as indicated by "DLC (WITHOUT BUSY)" in the drawing. That is to say, selection can be made regarding the data format of the lens data signals DLC between one with a BUSY notification added and one not added, in accordance with the processing situation at the lens microprocessor side.

Description will be made regarding the method of the camera microprocessor 205 identifying between whether or not there is a BUSY notification. The signal waveform indicated in "DLC (WITHOUT BUSY)" in FIG. 4 and the signal waveform indicated in "DLC (WITH BUSY)" in FIG. 4 include bit positions B1 and B2. The camera microprocessor 205 selects one of the bit positions B1 and B2 as a BUSY identification position P for identifying whether or not there is a BUSY notification. In this way, the present embodiment employs a data format where the BUSY identification position P is selected from bit positions B1 and B2. Thus, the problem of different processing times from transmission of the lens data signals DLC data frame until the BUSY notification (DLC is Low) is finalized, depending on the processing capabilities of the lens microprocessor 111, can be handled.

Whether the bit position B1 or the bit position B2 is to be the BUSY identification position P is decided by communication between the camera microprocessor 205 and lens microprocessor 111 before performing communication by communication method B. Note that the BUSY identification position P does not need to be fixed to one bit position of B1 and B2, and may be changed in accordance with the processing capabilities of the camera microprocessor 205 and lens microprocessor 111. Also note that the BUSY identification position P is not restricted to B1 or B2, and may be set at a predetermined location after the stop bit SP.

Now, the reason why the BUSY frame added to the clock signals LCLK in communication method A is added to the lens data signals DLC in communication method B as a data format will be described.

In the communication method A, the clock signals LCLK output by the camera microprocessor 205 that is the communication master and the BUSY signal output by the lens microprocessor 111 that is a communication slave need to be exchanged over the same clock channel. Accordingly, collision of the outputs of the camera microprocessor 205 and lens microprocessor 111 is prevented by time division. That is to say, collision of the outputs can be prevented by appropriately assigning outputtable periods for the camera microprocessor 205 and lens microprocessor 111 in the clock channel.

However, in this time division method, collision of the outputs of the camera microprocessor 205 and lens microprocessor 111 needs to be prevented in a sure manner. To this end, a certain output-forbidden period where output of the microprocessors 205 and 111 is forbidden is inserted between the point in time at which the camera microprocessor 205 has completed output of the eight pulses of clock signals LCLK and the point in time at which output of a BUSY signal by the lens microprocessor 111 is permitted. This output-forbidden period is a communication invalid period where the camera microprocessor 205 and lens microprocessor 111 cannot communicate, and thus leads to deterioration of effective communication speed.

In order to solve this problem, the communication method B employs the data format where the BUSY frame from the lens microprocessor 111 is added to the lens data signals DLC on the first data communication channel, which is a dedicated output channel for the lens microprocessor 111.

Next, the data format of the camera data signals DCL will be described. The specification of one data frame is the same as with the lens data signals DLC. However, adding of the BUSY frame to the camera data signals DCL is forbidden, unlike the lens data signals DLC.

Next, the procedures of communication by the communication method B between the camera microprocessor 205 and lens microprocessor 111 will be described. First, when an event occurs to start communication with the lens microprocessor 111, the camera microprocessor 205 sets the voltage level of the transmission request signals RTS to Low (hereinafter, this will be referred to as asserting a transmission request signal RTS), thereby notifying a communication request to the lens microprocessor 111. Upon detecting the communication request by the voltage level of transmission request signals RTS having changed to Low, the lens microprocessor 111 preforms generating processing of lens data signals DLC to transmit to the camera microprocessor 205. Once transmission preparation of the lens data signals DLC has been made, transmission of one frame of lens data signals DLC is started via the first data communication channel. Now, the lens microprocessor 111 starts transmission of the lens data signals DLC within the set time that has been mutually set between the camera microprocessor 205 and the lens microprocessor 111, from the point in time that the voltage level of the transmission request signals RTS has gone to Low.

That is to say, it is sufficient in the communication method B for the lens data to be transmitted to be finalized between the point in time that the voltage level of the transmission request signals RTS goes to Low up to transmission of the lens data signals DLC being started. There are no strict restrictions as with the communication method A, where the lens data to be transmitted has to be finalized by the point in time at which the first clock pulse is input, so the timing at which to start transmitting the lens data signals DLC can be given more freedom.

Next, the camera microprocessor 205 returns the voltage level of the transmission request signals RTS to High, in accordance with detection of the start bit ST added to the head of the lens data signals DLC data frame received from the lens microprocessor 111. Hereafter, this will be referred to as negating the transmission request signal RTS. Accordingly, the transmission request is cancelled, and transmission of the camera data signals DCL over the second communication channel is started. Note that either of negating transmission request signals RTS and starting transmission of camera data signals DCL may be first, and that it is sufficient for this to be performed by the time that reception of the lens data signals DLC data frame is completed.

In a case where the lens microprocessor 111 that has transmitted the lens data signals DLC data frame needs to notify the camera microprocessor 205 of a communication standby request BUSY, a BUSY frame is added to the lens data signals DLC. The camera microprocessor 205 monitors whether or not there are communication standby request BUSY notifications, and asserting transmission request signals RTS is forbidden while a communication standby request BUSY is being notified, for the next transmission request.

The lens microprocessor 111 executes necessary processing during the period where communication from the camera microprocessor 205 has been put on standby by the communication standby request BUSY, and the communication standby request BUSY is cancelled after preparation for the next communication is ready. The camera microprocessor 205 is permitted to assert transmission request signals RTS for the next transmission request, under the conditions that the communication standby request BUSY has been cancelled and that transmission of the camera data signals DCL data frame has been completed.

Thus, according to the present embodiment, the lens microprocessor 111 starts transmission of a lens data signals DLC data frame to the camera microprocessor 205 in accordance with transmission request signals RTS having been asserted with a communication start event at the camera microprocessor 205 as a trigger. The camera microprocessor 205 then starts transmission of a camera data signals DCL data frame to the lens microprocessor 111 in accordance with having detected the start bit ST of the lens data signals DLC.

The lens microprocessor 111 adds a BUSY frame after the lens data signals DLC data frame for a communication standby request BUSY as necessary, and hereafter cancels the communication standby request BUSY, thereby completing communication processing of one frame. According to this communication processing, one byte of communication data is mutually exchanged between the camera microprocessor 205 and lens microprocessor 111.

Figure 5A:
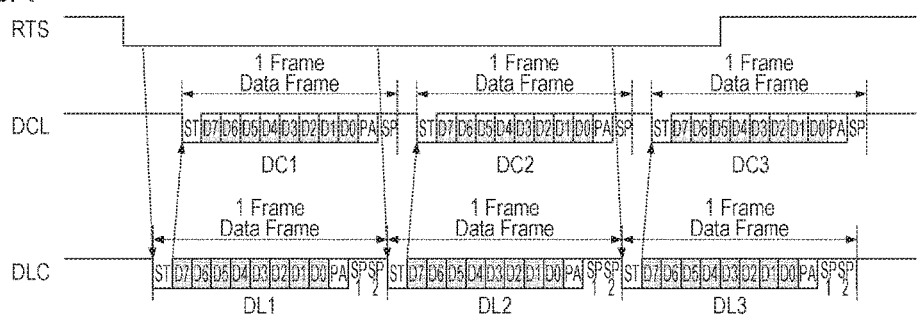
FIGS. 5A through 5C are schematic diagrams illustrating communication waveforms in a communication mode M3.

Next, the communication mode M3 where communication is performed by the format F2 using the communication method B will be described. FIG. 5A illustrates waveforms of the communication signals exchanged between the camera microprocessor 205 and lens microprocessor 111 in the communication mode M3. In FIG. 5A, the waveforms for communication signals in a case of consecutively transmitting three frames of data are illustrated. Adding a communication standby request BUSY to lens data signals DLC is forbidden in format F2, as described earlier.

In the lens data signals DLC data format in the communication mode M3, one frame is made up of a data frame alone, and here is no BUSY frame. Accordingly, the lens microprocessor 111 cannot notify the camera microprocessor 205 of a communication standby request BUSY in the communication mode M3.

This format F2 is used for usages of performing continuous communication with reduced inter-frame intervals, when transferring relatively large amounts of data between the camera microprocessor 205 and lens microprocessor 111. That is to say, the format F2 enables large amounts of data to be communicated at high speeds.

Figure 5B:
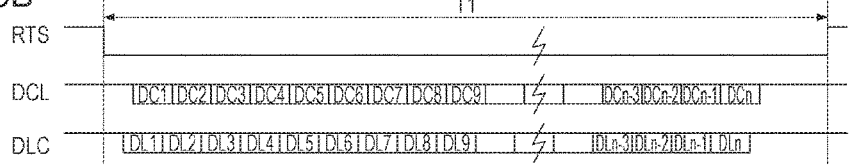

Next, the communication control processing between the camera microprocessor 205 and lens microprocessor 111 that is a feature of the present embodiment will be described. FIG. 5B illustrates waveforms of communication signals when each of the camera microprocessor 205 and lens microprocessor 111 consecutively transmit and receive n frames of camera data signals DCL and lens data signals DLC. The camera microprocessor 205 asserts transmission request signals RTS when an event of starting communication with the lens microprocessor 111 occurs. In the format F2, the camera microprocessor 205 does not need to negate the transmission request signals RTS in each frame, unlike with the format F1. Accordingly, the state of asserting transmission request signals RTS is maintained as long as a state where data can be consecutively transmitted/received.

Upon detecting a communication request by asserting of transmission request signals RTS, the lens microprocessor 111 performs processing to generate lens data signals DLC to transmit to the camera microprocessor 205. Once preparation for transmission of the lens data signals DLC is ready, transmission of the first frame of lens data signals DLC (DL1) is started over the first data communication channel.

The lens microprocessor 111 that has transmitted the first frame of the lens data signals DLC data frame confirms the transmission request signals RTS again. In a case where the transmission request signals RTS are in an asserted state, the lens microprocessor 111 transmits the second frame of lens data signals DLC (DL2) to the camera microprocessor 205 in succession after the first frame of which transmission has been completed. Thus, the lens data signals DLC (DL1 through DLn) are successively transmitted to the camera microprocessor 205 from the lens microprocessor 111 as long as the asserted state of transmission request signals RTS is maintained. Once transmission of the predetermined number of frames n has been completed, transmission of lens data signals DLC is stopped.

In response to detection of the start bit ST for each frame of lens data signals DLC from the lens microprocessor 111 being detected, the camera microprocessor 205 starts transmission of n frames of camera data signals DCL (DC1 through DCn) over the second communication channel.

Figure 5C:
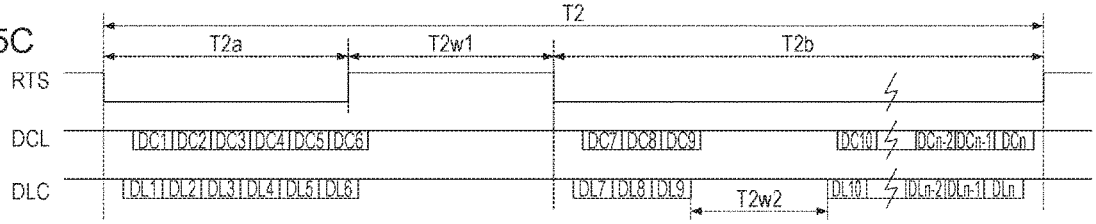

FIG. 5C illustrates waveforms of communication signals in a case where a temporary communication standby has been instructed from the camera microprocessor 205 or lens microprocessor 111 during the communication of consecutive data exchange illustrated in FIG. 5B. In this case as well, the lens microprocessor 111 starts transmission of lens data signals DLC due to transmission request signals RTS being asserted by the camera microprocessor 205, and the camera microprocessor 205 starts transmission of camera data signals DCL in accordance with detection of a start bit ST thereof.

T2$w$1 indicates a communication standby period that is a period regarding which communication standby has been instructed from the camera microprocessor 205, this instruction being notified to the lens microprocessor 111 by temporary negation of transmission request signals RTS. Upon detecting that the transmission request signals RTS have been negated, the lens microprocessor 111 pauses transmission after having completed transmission of the frame of lens data signals DLC that is being transmitted at the time of detection (DL6 in the drawing: hereinafter referred to as a pause frame).

In response to the pausing of transmission of lens data signals DLC, the camera microprocessor 205 also pauses transmission of the camera data signals DCL after having transmitted the frame corresponding to the above pause frame (DC6), out of the camera data signals DCL. According to this communication control, management can be performed so that the number of transmitted frames of lens data signals DLC and camera data signals DCL can be made to be the same even if a communication standby instruction occurs during communication of consecutive data exchange.

Once the communication standby request event is gone, the camera microprocessor 205 can instruct resuming of communication to the lens microprocessor 111, by asserting the transmission request signals RTS again. Transmission of lens data signals DLC by the lens microprocessor 111 is resumed from the next frame (DL7: hereinafter referred to as resume frame) after the pause frame, in accordance with the communication resume instruction. Upon detecting the start bit ST of the resume frame, the camera microprocessor 205 resumes transmission of camera data signals DCL from the frame (DC7) corresponding to the resume frame above.

On the other hand, T2$w$2 represents a communication standby period which is a period that communication standby has been instructed by the lens microprocessor 111. After ending of the communication standby period T2$w$1 in the drawings, neither the camera microprocessor 205 nor the lens microprocessor 111 has instructed communication standby, and the above-described resume frames DL7 and DC7, and subsequent frames DL8, DC8 through DL9, and DC9, are subjected to consecutive data transmission/reception, in that order.

When transmission of frame DL9 within the lens microprocessor 111 (reception of the frame DC9 at the camera microprocessor 205) is completed, a communication standby request event occurs, whereby the lens microprocessor 111 notifies the camera microprocessor 205 of a communication standby instruction.

When the transmission request signals RTS are in an asserted state, the lens microprocessor 111 does not transmit lens data signals DLC, thereby notifying the camera microprocessor 205 from the lens microprocessor 111 that communication will be paused.

The camera microprocessor 205 constantly monitors the start bit ST of each frame in the lens data signals DLC, and is stipulated such that, in a case where the start bit ST is not detected, transmission of the next frame of camera data signals DCL is stopped. In a case where the camera microprocessor 205 does not receive lens data signals DLC from the lens microprocessor 111 (DL10 in the drawing) even though it is asserting transmission request signals RTS, communication is paused without transmitting the camera data signals DCL (DC10). Note that the camera microprocessor 205 maintains the transmission request signals RTS in an asserted state during the communication standby period T2$w$2 under instruction from the lens microprocessor 111.

Thereafter, the communication standby request event in the lens microprocessor 111 is gone, and the lens microprocessor 111 resumes transmission of the resume frame DL10 of the lens data signals DLC. The camera microprocessor 205 resumes transmission of the corresponding frame DC10 in the camera data signals DCL in accordance with having detected the start bit ST of this resume frame DL10.

Figure 6:
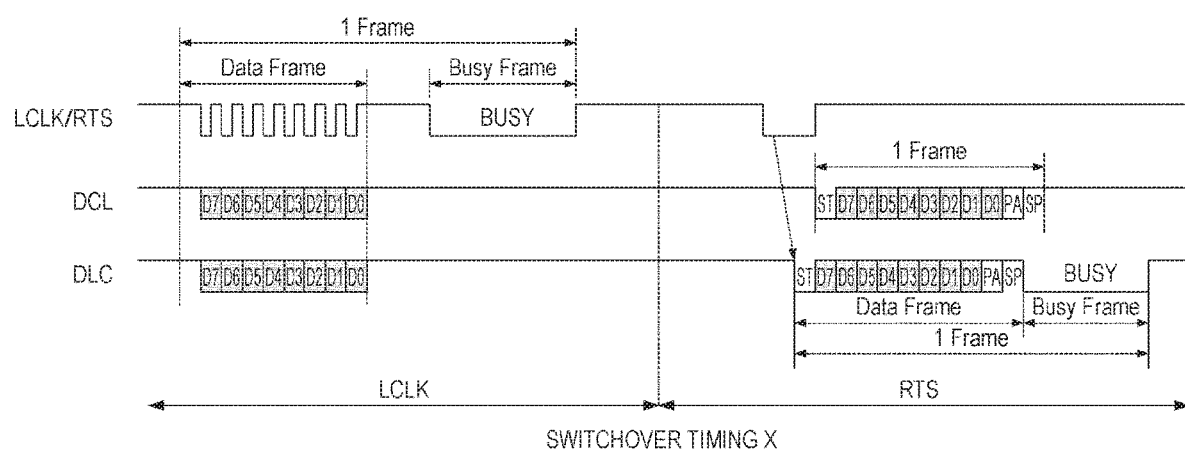
FIG. 6 is a schematic diagram describing procedures for switching from communication method A to communication method B.

Next, the procedures of switching from the communication method A to communication method B, which is a feature of the present invention, with reference to FIG. 6. FIG. 6 illustrates waveforms of communication signals exchanged between the camera microprocessor 205 and lens microprocessor 111 before and after switching from communication method A to communication method B. When switching from communication method A to communication method B, the camera microprocessor 205 changes the communication state of the camera communication unit from first settings corresponding to the communication method A to second settings corresponding to the communication method B. In the same way, the lens microprocessor 111 changes the communication state of the lens communication unit from first settings corresponding to the communication method A to second settings corresponding to the communication method B.

At the switchover timing X illustrated in FIG. 6, the switching of communication state is completed at the camera microprocessor 205 and lens microprocessor 111, and thereafter, communication is performed by communication method B. As described above, the notification channel functions as a clock channel in communication method A, and functions as a transmission request channel in communication method B.

In the present embodiment, the lens microprocessor 111 that is a communication slave in the communication method A performs changing to the second settings corresponding to the communication method B before the camera microprocessor 205 that is the communication master.

Switching of the communication method is performed by instruction from the camera microprocessor 205. The camera microprocessor 205 transmits a notification to switch from communication method A to communication method B, by communication by the communication method A via the second data communication channel. This switching notification is contained within a data frame. The lens microprocessor 111 that has received the switching notification superimposes a BUSY signal on the clock channel, thereby notifying the communication standby request BUSY to the camera microprocessor 205. The communication state of the lens microprocessor 111 is then changed from the first settings corresponding to the communication method A to the second settings corresponding to the communication method B, while the camera microprocessor 205 is being notified of the communication standby request BUSY.

When switching of the communication method at the lens microprocessor 111 is complete, the lens microprocessor 111 cancels the communication standby request BUSY, and monitors whether or not there is notification of transmission request signals RTS in the communication method B.

Upon the communication standby request BUSY being cancelled, the camera microprocessor 205 changes the communication state of the camera microprocessor 205 from the first settings corresponding to the communication method A to the second settings corresponding to the communication method B and monitors whether or not there is a communication event occurring in the communication method B. The timing of completion of switching to the communication method B at the camera microprocessor 205 is the switchover timing X, as illustrated in FIG. 6. After the switchover timing X, data communication is executed by the communication method B, as described with reference to FIG. 4.

A configuration is employed in the present invention where the lens microprocessor 111 serving as a communication slave changes from the first settings to the second settings before the camera microprocessor 205 serving as the communication master, as described earlier. Whether the lens microprocessor 111 can immediately execute change to the second settings is unclear, so the camera microprocessor 205 executes change from the first settings to the second settings upon having confirmed that the lens microprocessor 111 has changed to the second settings.

If the camera microprocessor 205 executes change to the second settings without confirming that the lens microprocessor 111 has executed change to the second settings, a situation may occur where the communication methods differ between the interchangeable lens 100 and camera main body 200, and communication cannot be established between the two. In the present invention, the camera microprocessor 205 executes change from the first settings to the second settings upon having confirmed that the lens microprocessor 111 has changed to the second settings, thereby preventing the above-described situation from occurring.

The lens microprocessor 111 changes the communication state of the lens microprocessor 111 from the first settings to the second settings, while the camera microprocessor 205 is being notified of the communication standby request BUSY. Accordingly, the communication state can be changed in a state where no clock signals LCLK are output from the camera microprocessor 205, and a situation where collision of communication occurs between the camera microprocessor 205 and lens microprocessor 111 can be avoided.

Note that the lens microprocessor 111 does not necessarily have to switch communication methods in according with notification to switch from communication method A to communication method B, and an arrangement may be made where switching of communication methods is refused. For example, after having received a switching notification from the camera microprocessor 205, a notification indicating refusal to switch communication methods is transmitted via the first data communication channel. The camera microprocessor 205 that has received this can maintain communication with the lens microprocessor 111 in the communication method A, without changing the communication state. Accordingly, in a case where the lens microprocessor 111 cannot immediately execute change to the second settings, a situation where the camera microprocessor 205 that has executed change from the first settings to the second settings has to immediately execute change to the first settings again can be avoided.

Figure 7:
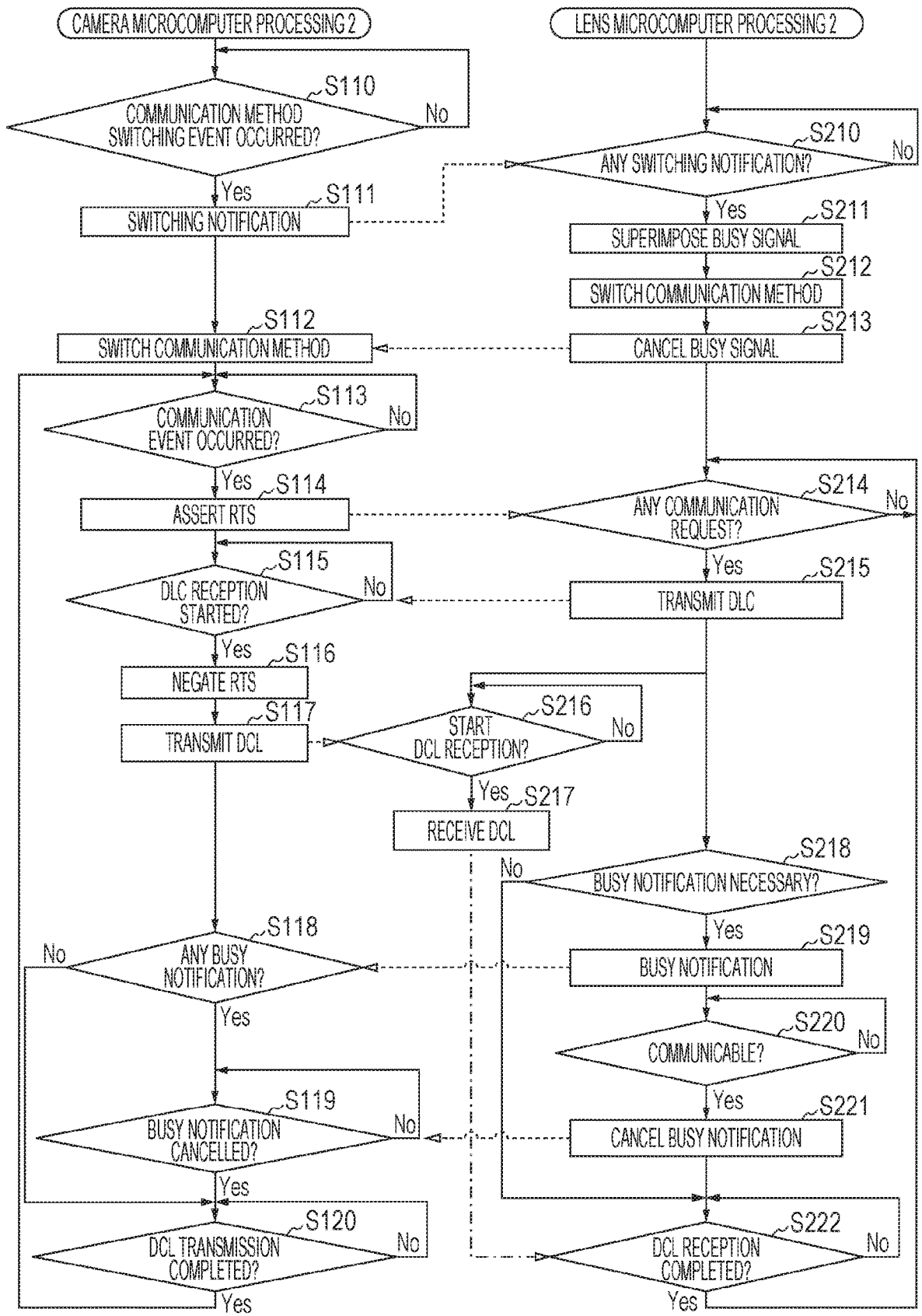
FIG. 7 is a flowchart for describing procedures for switching from communication method A to communication method B, and a data communication flow in communication method B.

Next, procedures for switching from communication method A to communication method B, and a data communication flow in communication method B, will be described with reference to FIG. 7. The camera microprocessor 205 and lens microprocessor 111 perform the communication control of the flowchart in FIG. 7, following a communication control program that is a computer program. Note that "S" in FIG. 7 means step.

The camera microprocessor 205 monitors whether or not a communication method switching event from communication method A to communication method B has occurred, and in a case where a switching event has occurred in step S110, advances to step S111. In step S111, a communication method switching notification is transmitted to the lens microprocessor 111 via the second data communication channel.

The lens microprocessor 111 monitors whether or not a switching notification has been transmitted, and upon having received the switching notification in step S210 (YES in step S210), superimposes a BUSY signal on the clock channel, and advances to step S212. In step S212, the communication state of the lens microprocessor 111 is changed from the first settings corresponding to the communication method A to the second settings corresponding to the communication method B, and further, the communication standby request BUSY is cancelled in step S213.

In accordance with the communication standby request BUSY having been cancelled, the camera microprocessor 205 changes the communication state of the camera microprocessor 205 from the first settings corresponding to the communication method A to the second settings corresponding to the communication method B, in step S112. Accordingly, the communication states of both the camera microprocessor 205 and lens microprocessor 111 are changed to the second settings corresponding to the communication method B, and thereafter, communication is performed by the communication method B.

Hereinafter, the communication flow by the communication method B will be described. The camera microprocessor 205 monitors whether or not a communication event for starting communication with the lens microprocessor 111 has occurred, and in a case where a communication event has occurred in step S113, advances to step S114. Transmission request signals RTS are asserted in step S114 as described so far, thereby placing a communication request with the lens microprocessor 111.

The lens microprocessor 111 monitors whether or not there has been assertion of transmission request signals RTS, and upon recognizing that there has been assertion of transmission request signals RTS in step S214, advances to step S215. In step S215, the lens microprocessor 111 transmits lens data signals DLC to the camera microprocessor 205 via the first data communication channel.

Upon detecting start of reception of lens data signals DLC (YES in step S115), the camera microprocessor 205 advances to step S116, and negates transmission request signals RTS. The flow then advances to step S117, and camera data signals DCL are transmitted to the lens microprocessor 111 via the second data communication channel.

Upon detecting start of reception of camera data signals DCL in step S216, the lens microprocessor 111 advances to step S217, and performs reception processing of the camera data signals DCL. In parallel with the processing of step S217, determination is made in step S218 regarding whether or not there is need to notify the camera microprocessor 205 of a communication standby request BUSY. In a case where there is no need to make notification of a communication standby request BUSY, the flow advances to step S222, and stands by until reception of the camera data signals DCL ends.

On the other hand, in a case where there is a need for the lens microprocessor 111 to notify the camera microprocessor 205 of a communication standby request BUSY, the flow advances to step S219, and a BUSY frame is added to the lens data signals DLC. The lens microprocessor 111 executes necessary processing while notification of the communication standby request BUSY is being notified, and after preparation for the next communication has been completed (Yes in step S220), the communication standby request BUSY is cancelled (S221). After having canceled the communication standby request BUSY, the flow advances to step S222, and stands by until reception of the camera data signals DCL is completed. Upon reception of the camera data signals DCL is complete (Yes in step S222), the flow returns to step S214, and monitoring of whether transmission request signals RTS have been asserted is continued.

Upon having received the communication standby request BUSY in step S118, the camera microprocessor 205 stands by until the communication standby request BUSY is cancelled. When the communication standby request BUSY is cancelled (YES in step S119), the flow advances to step S120, and determination is made regarding whether or not transmission of the camera data signals DCL has been completed. Even in a case where notification of a communication standby request BUSY has not been received in step S118, the flow advances to step S120, and determination is made regarding whether or not transmission of the camera data signals DCL has been completed. If determination is made in step S120 that transmission of the camera data signals DCL has been completed, the flow returns to step S113, and monitoring of whether or not a communication event has occurred is continued.

As described above, the present embodiment relates to control of switching communication methods in communication control performed between the camera main body 200 and interchangeable lens 100 using three channels. The communication methods between the camera main body 200 and interchangeable lens 100 are switched between the clock-synchronized method (communication method A) and the asynchronous method (communication method B).

In the communication method A, the lens microprocessor 111 can superimpose BUSY signals on the clock channel. The lens microprocessor 111 changes the communication state from the first settings corresponding to the communication method A to the second settings corresponding to the communication method B while the BUSY signal is being superimposed. The lens microprocessor 111 can change the communication state in a state where there will be no output of clock signals LCLK from the camera microprocessor 205. That is to say, change of the communication state can be executed without collision of communication occurring between the camera microprocessor 205 and the lens microprocessor 111.

In accordance with change to the second settings at the lens microprocessor 111 having been completed, the camera microprocessor 205 changes the communication state from the first settings corresponding to the communication method A to the second settings corresponding to the communication method B. Accordingly, in a case where change to the second settings cannot be executed at the lens microprocessor 111, a situation where changing of communication states between the first settings and the second settings is repeated at the camera microprocessor 205 can be avoided.

Switching of communication methods can be executed without leading to breakdown of communication, without adding new channels, by switching communication methods between the camera main body 200 and interchangeable lens 100 by the procedures described above.

The above-described embodiment is only a representative example, and various modifications and alterations may be made to the embodiments when carrying out the present invention. For example, although an example of using an interchangeable lens as the accessory device has been illustrated in the above embodiment, a strobe or the like may be used as long as having function of communicating with the imaging apparatus.

The present invention can also be realized by processing of a program realizing one or more of functions of the above-described embodiment being supplied to a system or apparatus via a network or recording medium, and one processor or more in the system or apparatus in the computer reading out and executing the program. This can also be realized by a circuit having one or more function (e.g., an ASIC).

According to the present invention, an accessory device and imaging apparatus capable of executing switching of communication methods without leading to breakdown of communication, without adding new channels, can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An accessory device detachably mountable to an imaging apparatus, the accessory device comprising;
   an accessory communication unit that provides, between itself and the imaging apparatus, channels including a notification channel used for notification between the imaging apparatus and the accessory device; and
   an accessory control unit that performs control of the accessory communication unit,
   wherein the accessory device is capable of switching between first settings corresponding to a clock-synchronized communication method that is synchronized with clock signals, and second settings corresponding to an asynchronous communication method,
   wherein, after the accessory control unit receives an instruction to switch from the first settings to the second settings from the imaging apparatus in the first settings, the accessory control unit transmits a communication standby request signal to the imaging apparatus via the notification channel, the communication standby request signal being a signal for preventing data communication from the imaging apparatus to the accessory device,
   and wherein the accessory control unit ends to transmit the communication standby request signal to the imaging apparatus after switching from the first settings to the second settings in the accessory device is complete.

2. The accessory device according to claim 1, wherein the communication standby request signal is transmitted by changing a voltage level of the channel.

3. The accessory device according to claim 2, wherein the accessory control unit transmits the communication standby request signal by changing the voltage level from a first level to a second level that is lower than the first level.

4. The accessory device according to claim 1, wherein, after completion of switching from the first settings to the second settings at the accessory device, the accessory control unit starts data transmission from the accessory device to the imaging apparatus in accordance with having received a transmission request signal, requesting data transmission from the accessory device to the imaging apparatus, from the imaging apparatus via the notification channel.

5. The accessory device according to claim 1, wherein the channels include an accessory data communication channel used for transmission of data from the accessory device to the imaging apparatus, the accessory device notifies the imaging apparatus of the communication standby request signal via the notification channel in the first settings, and notifies the imaging apparatus of the communication standby request via the accessory data communication channel in the second settings.

6. The accessory device according to claim 5, wherein, in the second settings, the accessory control unit adds the communication standby request signal to a data frame to be transmitted via the accessory data communication channel.

7. The accessory device according to claim 5, wherein the channels are made up of the notification channel, the accessory data communication channel used for data transmission from the accessory device to the imaging apparatus, and an imaging apparatus data communication channel used for data transmission from the imaging apparatus to the accessory device.

8. The accessory device according to claim 1, including an imaging optical system capable of forming a subject image on an imaging device that the imaging apparatus has.

9. A non-transitory storage medium storing a communication control program for causing a computer of an accessory device, detachably mountable to an imaging apparatus, the accessory device being capable of switching between first settings corresponding to a clock-synchronized communication method that is synchronized with clock signals, and second settings corresponding to an asynchronous communication method, and providing, between itself and the imaging apparatus, channels including a notification channel used for notification from the imaging apparatus to the accessory device, to execute
   a step of receiving an instruction to switch from the first settings to the second settings from the imaging apparatus, in the first settings, and
   a step of transmitting, to the imaging apparatus via the notification channel, a communication standby request signal for preventing data communication from the imaging apparatus to the accessory device, and
   a step of ending to transmit the communication standby request signal to the imaging apparatus after switching from the first settings to the second settings in the accessory device is complete.

10. An imaging system including an imaging apparatus, and an accessory device detachably mountable to the imaging apparatus,
   the accessory device having an accessory communication unit that provides, between itself and the imaging apparatus, channels including a notification channel used for notification from the imaging apparatus to the accessory device, and an accessory control unit that performs control of the accessory communication unit,
   the imaging apparatus having an imaging apparatus communication unit that provides, between itself and the accessory device, channels including the notification channel, and an imaging apparatus control unit that performs control of the imaging apparatus communication unit,
   wherein the imaging apparatus and the accessory device are each capable of switching a communication state thereof between first settings corresponding to a clock-synchronized communication method that is synchronized with clock signals, and second settings corresponding to an asynchronous communication method,
   wherein, after the accessory control unit receives an instruction to switch from the first settings to the second settings from the imaging apparatus in the first settings, the accessory control unit transmits, to the imaging apparatus via the notification channel, a communication standby request signal for preventing data communication from the imaging apparatus to the accessory device, the communication standby request signal being a signal for preventing data communication from the imaging apparatus to the accessory device,
   wherein the accessory control unit ends to transmit the communication standby request signal to the imaging apparatus after switching from the first settings to the second settings in the accessory device is complete,
   and wherein the camera control unit performs switching from the first settings to the second settings at the imaging apparatus in accordance with a completion of transmitting the communication standby request signal from the accessory device.

* * * * *